United States Patent [19]

Ohe et al.

[11] Patent Number: 4,845,505
[45] Date of Patent: Jul. 4, 1989

[54] AUTOMOBILE ANTENNA SYSTEM FOR DIVERSITY RECEPTION

[75] Inventors: Junzo Ohe, Toyota; Hiroshi Kondo, Okazaki, both of Japan

[73] Assignee: Toyota Jidosha Kabushiki Kaisha, Toyota, Japan

[21] Appl. No.: 14,520

[22] Filed: Feb. 13, 1987

[51] Int. Cl.[4] ............................................. H01Q 1/32
[52] U.S. Cl. .................................. 343/712; 343/713; 343/741; 343/742
[58] Field of Search ................ 343/711, 712, 713, 741, 343/742; 455/277

[56] References Cited

U.S. PATENT DOCUMENTS

| | | | |
|---|---|---|---|
| d,506,267 | 3/1985 | Harmuth | 343/744 |
| 2,200,674 | 5/1940 | McDonald, Jr. | 343/702 |
| 2,212,253 | 8/1940 | Stief | 343/715 |
| 2,404,093 | 7/1946 | Roberts | 343/708 |
| 2,481,978 | 9/1949 | Clough | 343/712 |
| 2,520,986 | 9/1950 | Williams et al. | 343/712 |
| 2,575,471 | 11/1951 | Schweiss et al. | 343/712 |
| 2,740,113 | 3/1956 | Hemphill | 343/787 |
| 2,774,811 | 12/1956 | Shanok et al. | 343/711 |
| 2,859,441 | 11/1958 | Rosenbaum | 343/712 |
| 2,950,479 | 12/1960 | Pan | 343/702 |
| 2,971,191 | 2/1961 | Davis | 343/712 |
| 3,007,164 | 10/1961 | Davis | 343/712 |
| 3,066,293 | 11/1962 | Davis | 343/767 |
| 3,210,766 | 10/1965 | Parker | 343/743 |
| 3,364,487 | 1/1968 | Meheux | 343/702 |
| 3,611,388 | 10/1971 | Okumura | 343/712 |
| 3,717,876 | 2/1973 | Volkers et al. | 343/712 |
| 3,728,732 | 4/1973 | Igarashi | 343/713 |
| 3,742,508 | 6/1973 | Tomaszewski | 343/713 |
| 3,794,997 | 2/1974 | Iwatsuki et al. | 343/712 |
| 3,823,403 | 7/1974 | Walter et al. | 343/744 |
| 3,916,413 | 10/1975 | Davis | 343/712 |
| 3,961,292 | 6/1976 | Davis | 343/712 |
| 3,961,330 | 6/1976 | Davis | 343/712 |
| 3,972,048 | 7/1976 | Davis | 343/712 |
| 4,003,056 | 1/1977 | Davis | 343/713 |
| 4,080,603 | 3/1978 | Moody | 343/712 |
| 4,217,591 | 8/1980 | Czerwinski | 343/713 |
| 4,278,980 | 7/1981 | Ogita et al. | 343/748 |
| 4,317,121 | 2/1982 | Allen, Jr. | 343/712 |
| 4,339,827 | 3/1982 | Torres | 343/748 |
| 4,499,606 | 2/1985 | Rambo | 455/277 |
| 4,566,133 | 1/1986 | Rambo | 455/277 |

FOREIGN PATENT DOCUMENTS

| | | |
|---|---|---|
| 0081765 | 12/1982 | European Pat. Off. |
| 0153498 | 12/1984 | European Pat. Off. |
| 889618 | 9/1953 | Fed. Rep. of Germany |
| 1131762 | 6/1962 | Fed. Rep. of Germany |
| 1949828 | 10/1969 | Fed. Rep. of Germany |
| 7015306 | 4/1970 | Fed. Rep. of Germany |
| 2425189 | 5/1973 | Fed. Rep. of Germany |
| 2514181 | 1/1975 | Fed. Rep. of Germany |
| 2701921 | 7/1978 | Fed. Rep. of Germany |
| 2745475 | 4/1979 | Fed. Rep. of Germany |
| 2821202 | 11/1979 | Fed. Rep. of Germany |
| 2733478 | 4/1980 | Fed. Rep. of Germany |
| 53-22418 | 7/1978 | Japan |
| 53-34826 | 8/1978 | Japan |
| 0046617 | 1/1980 | Japan |
| 0158540 | 12/1981 | Japan ............... 455/277 |
| 59-44861 | 3/1984 | Japan |
| 59-195811 | 12/1984 | Japan |
| 60-129464 | 3/1985 | Japan |
| 60-175221 | 10/1985 | Japan |

OTHER PUBLICATIONS

Japanese Pat. Abstract vol. 6, No. 37 E-97, Mar. 6. 1982, 56-156031.

(List continued on next page.)

*Primary Examiner*—William L. Sikes
*Assistant Examiner*—Hoanganh Le
*Attorney, Agent, or Firm*—Cushman, Darby & Cushman

[57] ABSTRACT

An automobile antenna system for diversity reception includes high-frequency pickups for effectively picking up the high-frequency surface currents which are induced on a vehicle body by broadcast waves and which flow concentratedly on the marginal edge portions of the vehicle body. The high-frequency pickups are disposed on both sides of the roof panel at the rear and front portions of a vehicle body in close proximity to the marginal edge and in a concealed state without any external exposure. The pickup that enjoys the optimum reception at any given time is selected from among the pickups by automatic changeover.

3 Claims, 8 Drawing Sheets

OTHER PUBLICATIONS

Japanese Pat. Abstract vol. 6, No. 55 E–101, 4/10/82, 56–168441.
Japanese Pat. Abstract vol. 7, No. E–187, 7/15/83, 58–70640.
Japanese Pat. Abstract vol. 7, No. 162, E–187, 7/15/83, 58–70642.
Abstract of 55–88407, ANTENNA DEVICE; 4/7/80.
Abstract of 60–169204, ON VEHICLE ANTENNA SYSTEM; 2/9/85.
Abstract of 60–172804 ANTENNA SYSTEM FOR VEHICLE; 2/9/85.
Abstract of 56–62403, ANTENNA FOR AUTOMOBILE; 5/28/1981.
Abstract of 59–44132 ANTENNA DEVICE FOR MOVING BODY; 3/12/1984.

(a)

(b)

AUTOMOBILE ANTENNA SYSTEM FOR DIVERSITY RECEPTION

BACKGROUND OF THE INVENTION

1. Field of the Invention

The present invention relates to an automobile antenna system for diversity reception which uses a plurality of high-frequency pickups as a receiving antenna and, more particularly, to an improved automobile antenna system for diversity reception which receives broadcast waves using a pickup which is in the optimum reception state, by performing an appropriate switchover between the plurality of pickups in the reception state.

2. Description of the Prior Art

Stable reception of broadcast waves is generally difficult during the travel of a vehicle, and FM waves, which are high-frequency waves in the VHF band, have a strong tendency to suffer from rectilinear propagation, so that direct waves and other waves interfere with each other as a result of bouncing off buildings, hill sides or other obstacles and this phenomenon produces distortion or intermittent break of sound, which is called the multipath phenomenon.

Therefore, the reception of broadcast waves varies in correspondence with the running state of the vehicle, which often produces of deterioration of the sound or picture quality of the radio or TV set installed in the vehicle.

To solve this problem, for example, in TV sets, a diversity reception system has been adopted, in which a plurality of TV antennas are disposed on the vehicle body so that the receiving operation of broadcast waves is taken over by the antenna which enjoys superior reception by automatic changeover to that antenna based on reception performance. As such a system, a diversity reception system for an automobile TV is known in which the TV antenna that enjoys the optimum reception at any given time is selected from among a plurality of TV antennas which are provided in advance on a vehicle body on the basis of a state in which a video signal separated from a sound signal is received.

This system enables good pictures to be constantly displayed on the CRT of the TV, because selection and switch-over operation for selecting the optimum TV antenna is conducted by comparing the level of a video signal with a reference level in synchronization with the vertical fly-back period of the video signal.

As the frequency bands of broadcast or communication waves have recently been enlarged, a multiplicity of antennas for receiving the waves in the respective frequency bands are newly required. As a result, the aesthetic appearance of the automobile is degraded, and the receiving performance is greatly deteriorated by electrical interference between the antennas. Various efforts have been made to remove the conventional pole type antennas or conceal them. For example, a method of pasting a fine-gauge antenna wire to the rear windshield has been put to practical use.

Another type of improved antenna system has been proposed which detects the surface currents induced on a vehicle body by broadcast waves. Although utilization of currents which flow on the vehicle body may apparently be the most reliable and efficient means, experiments carried out heretofore have shown very unfavorable results.

The first reason why the surface currents on an ordinary vehicle body cannot be effectively utilized is that the value of the surface currents has proved to be lower than expected so that it has not been possible to obtain a detecting output from the surface currents on the roof panel of a vehicle body (the portion mainly used for detection) that is at a high enough level.

The second reason is that the surface currents often have noise mixed therein. This noise is mainly produced by the engine ignition system of the vehicle and its battery charging regulator system, and it leaks into the vehicle body during the operation of the engine. It is therefore impossible to realize reception of broadcast waves in a clear enough manner for this system to be put to practical use.

As described above, a conventional antenna system which detects the currents induced on a vehicle body by broadcast waves is not always successful.

Thus, to date, the problems relating to the design of a pickup structure suitable for efficiently detecting the currents flowing on a vehicle body which are induced by broadcast waves and the question of how to arrange the necessary pickups in such a manner as to ensure a good S/N ratio for practical use have not been fully solved. In particular, the high-frequency directional characteristics of a high-frequency pickup as an antenna is poor, and further multipath noise is likely to be produced in the reception of FM broadcast waves of high frequency such as those in the VHF band.

SUMMARY OF THE INVENTION

Accordingly, it is an object of the present invention to eliminate the above-described problems and to provide an improved automobile antenna system for diversity reception which is capable of effectively detecting the currents induced on a vehicle body by broadcast waves by means of a diversity reception system.

A conventional antenna system is mainly aimed at reception of AM waves, which was the demand at one time. However, the wavelength of such broadcasting waves are too long for an antenna which detects the currents on a vehicle body, and good receiving properties cannot be obtained with respect thereto. The present inventors took notice of these frequency dependency characteristics, and the broadcast waves which the present invention aimed to deal with are limited to high-frequency broadcast waves, higher than AM frequency bands. This approach has enabled very effective reception from the currents on a vehicle body to be obtainable, which has conventionally been considered to be impossible.

In the present invention, high-frequency pickups are provided at certain portions of the vehicle body at which noise is unlikely to be picked up and at which the density of broadcast waves is high, because the high-frequency currents vary at different locations on the vehicle body, and the front portion and the rear portion are selected as portions which meet these conditions.

Accordingly, in an automobile antenna system according to the present invention, high-frequency pickups are disposed on both sides at the front and rear portions of a vehicle body in proximity to the peripheral edge thereof in order to positively detect high-frequency currents having the above-described frequency characteristics, and a space diversity reception system is adopted which enables the high-frequency pickup which enjoys the optimum receiving sensitivity at any given time to be always selected from among the pickups available.

The plurality of high-frequency pickups disposed at different marginal portions of a vehicle body in proximity to the peripheral edges as described above can together compensate for any degradation of sensitivity in correspondence with the direction in which broadcast waves are received, whereby the best possible diversity reception is enabled without any external exposure of the antenna system.

As the high-frequency pickup, both loop antenna type pickup for electromagnetically detecting the magnetic flux which is induced by currents on a vehicle body and electrode type pickup for electrostatically detecting a high-frequency signal by producing an electrostatic capacity with a vehicle body are usable. Both of these pickups provide efficient detection.

The above and other objects, features and advantages of the present invention will become clear from the following description of the preferred embodiment thereof, taken in conjunction with the accompanying drawings.

DESCRIPTION OF THE PREFERRED EMBODIMENT

A preferred embodiment of an automobile antenna system according to the present invention will be explained hereinunder with reference to the accompanying drawings.

FIGS. 9 to 14 illustrate a process for examining the distribution characteristics of high-frequency currents so as to ascertain the location at which an antenna system can operate most efficiently on the vehicle body of an automobile.

Figure 9:
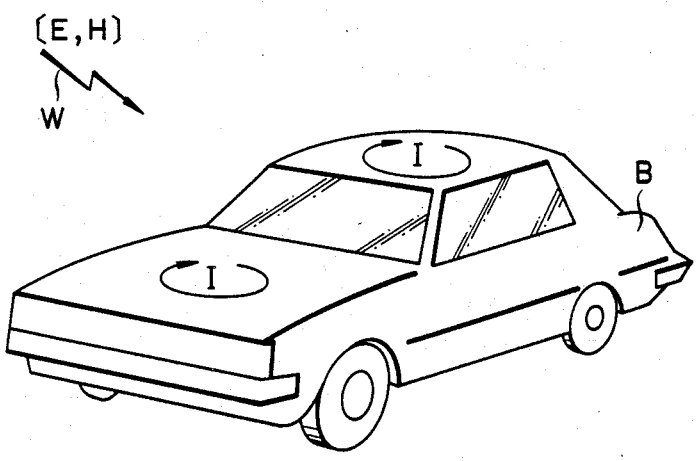
FIG. 9 is an explanatory view of the surface currents I produced on the vehicle body B by external waves W.

FIG. 9 shows that when external electromagnetic waves W, such as broadcast waves, pass through the vehicle body B of a conductive metal, surface currents I are induced at various vehicle locations at levels corresponding to the intensities of electromagnetic waves passing therethrough. The present invention aims at only electromagnetic waves of relatively high frequency bands in excess of 50 MHz, such as FM broadcast waves and TV waves.

The present invention is characterized in that the distribution of the surface currents induced on the vehicle body by electromagnetic waves within the above-described particular wave bands is measured so as to seek a location on the vehicle body which is higher in surface current density and lower in noise and at which a pickup used in the present invention is located.

The distribution of surface currents is determined by a simulation using a computer and also by measuring actual intensities of surface currents at various locations on a vehicle body. In accordance with the present invention, the measurement is carried out by the use of a probe which can operate in accordance with the same principle as that of a high-frequency pickup actually located on the vehicle body at a desired location, as will be described later. Such a probe is moved on the vehicle body throughout the entire surface thereof to measure the level of surface currents at various locations of the vehicle body.

Figure 10:
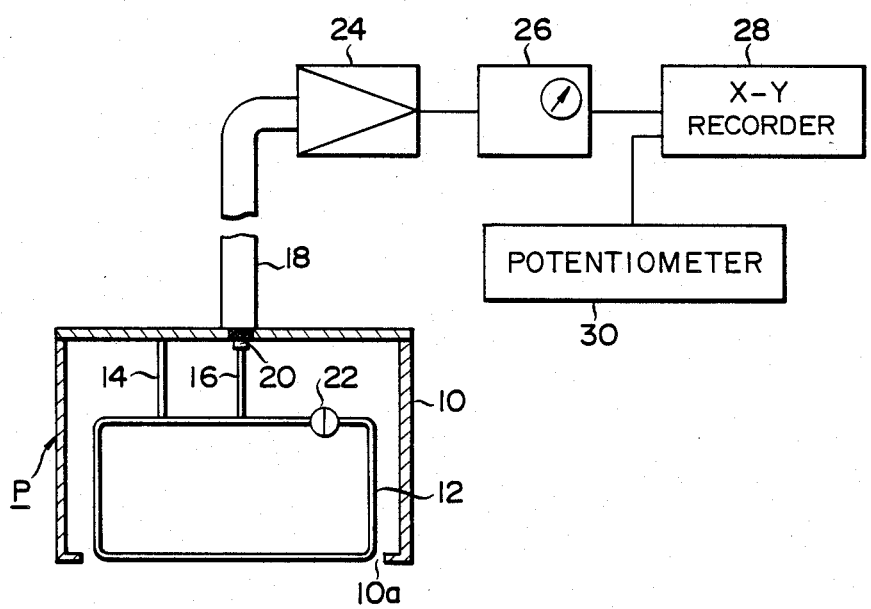
FIG. 10 illustrates a probe for detecting the distribution of surface currents on the vehicle body and having the same construction as that of the high-frequency pickup used in the present invention, and a circuit for processing signals from the probe.

FIG. 10 shows an example of such a probe P which is constructed in accordance with substantially the same principle as that of the high-frequency pickup described hereinafter. The probe P is composed of a casing 10 of an electrically conductive material for preventing any external electromagnetic wave from transmitting to the interior thereof and a loop coil 12 fixed within the casing 10. The casing 10 includes an opening 10a formed therein through which a portion of the loop coil 12 is externally exposed. The exposed portion of the loop coil 12 is positioned in close proximity to the surface of the vehicle body B to detect magnetic flux induced by surface currents on the vehicle body B. Another portion of the loop coil 12 is connected with the casing 10 through a short-circuiting line 14. The loop coil 12 further includes an output end 16 connected with a core 20 in a coaxial cable 18. Still another portion of the loop coil 12 includes a capacitor 22 for causing the frequency in the loop coil 12 to resonate relative to the desired frequency to be measured to increase the efficiency of the pickup.

Thus, when the probe P is moved along the surface of the vehicle body B and also angularly rotated at various locations of measurement, the distribution and direction of surface currents can accurately be determined at each of the vehicle locations. In FIG. 10, the output of the probe P is amplified by a high-frequency voltage amplifier 24 and the resulting output voltage is measured by a high-frequency voltmeter 26. This coil output voltage is read at the indicated value of the high-frequency voltmeter 26 and also is recorded by an XY recorder 28 to provide the distribution of surface currents at various vehicle locations. The input of the XY recorder 28 receives signals indicative of various vehicle locations from a potentiometer 30 to recognize the value of high-frequency surface currents at the corresponding vehicle location.

Figure 11:
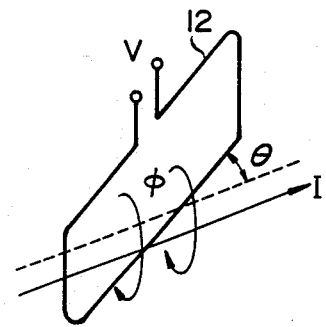
FIG. 11 illustrates the electromagnetic coupling between the surface currents I and the pickup loop antenna.
Figure 12:
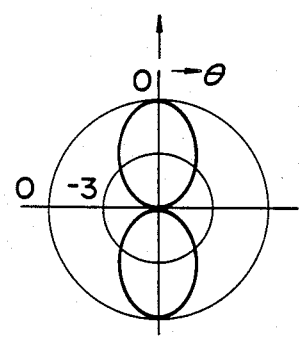
FIG. 12 illustrates the directional pattern of the loop antenna in FIG. 11.
Figure 13:
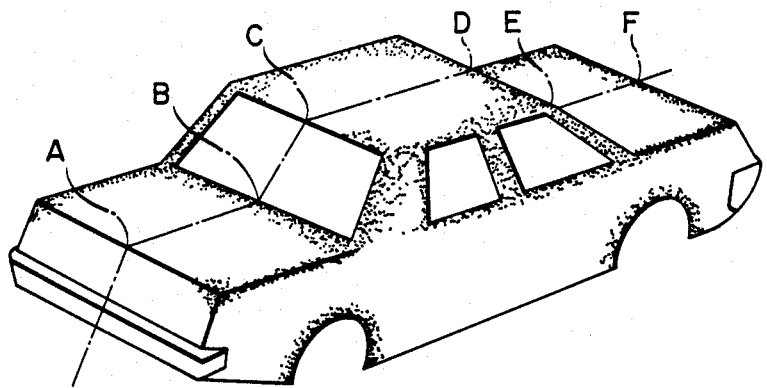
FIG. 13 illustrates the intensity distribution of the surface currents on the vehicle body.

FIG. 11 illustrates an angle $\theta$ of deflection between the high-frequency surface currents I and the loop coil 12 of the pickup. As is clear from the drawing, magnetic flux $\phi$ is interlinked with the loop coil to generate a detection voltage V in the loop coil 12. As shown in FIG. 13, when the angle $\theta$ of deflection is equal to zero, that is, the surface currents I are parallel to the loop coil 12 of the pickup, the maximum voltage can be obtained. The direction of the surface currents I when the probe P is rotated to obtain the maximum voltage can also be known.

Figure 14:
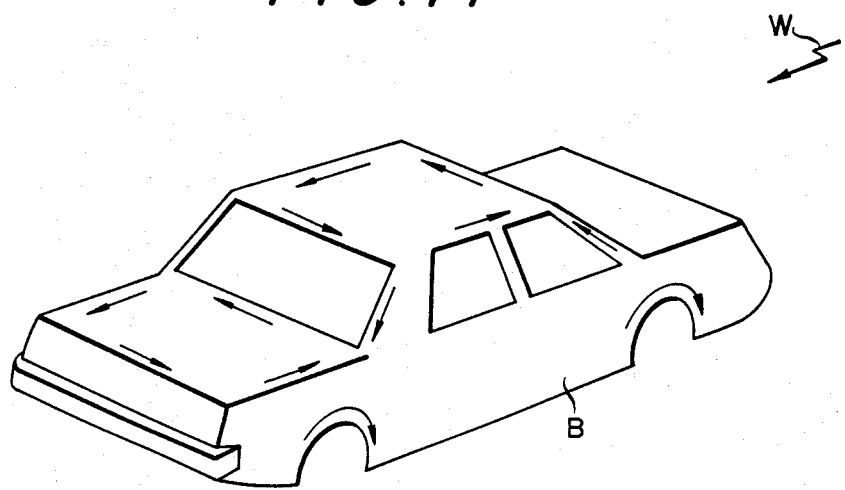
FIG. 14 shows the directions of the flow of the surface currents on the vehicle body.

FIGS. 13 and 14 respectively show the magnitude and direction of high-frequency surface currents induced at various different locations on the vehicle body at the frequency of 80 MHz, the values of which are obtained from the measurements of the probe P and the simulation effected by the computer. As is clear from FIG. 13, the distribution of surface currents has higher densities at the marginal portions of the vehicle body and lower densities at the central portion of the flat vehicle panels.

It will also be apparent from FIG. 14, that the surface currents are concentrated in the direction parallel to the marginal edge of the vehicle body or in the direction along the connections of various flat panels.

In the present invention, high-frequency pickups are disposed on the roof panel. A plurality of high-frequency pickups constituting a diversity antenna are disposed in close proximity to the peripheral edge of the roof panel with the longitudinal direction of, for example, each loop antenna in parallel to the corresponding peripheral edge. In order to obtain very good sensitivity adequate for practical use, the pickup is preferably disposed apart from the edge at a distance which is within a range which depends upon the carrier frequency of the broadcast waves.

Figure 1:
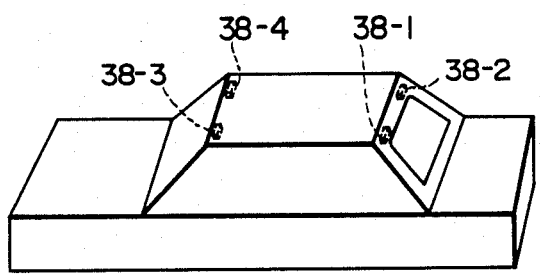
FIG. 1 shows an embodiment of an automobile antenna system according to the present invention, showing the arrangement of high-frequency pickups.

FIG. 1 shows an embodiment of the present invention. The arrangement of four high-frequency pickups 38 - 1 to 38 - 4 which constitute the diversity antenna in this embodiment is shown. The high-frequency pickups 38 - 1 to 38 - 4 are provided on the roof panel at the rear portion and the front portion of a vehicle body.

This embodiment is an antenna system which functions as a diversity antenna for receiving high frequencies and is especially suitable for a vehicle provided with a retainer on which an edge molding is mounted (hereinunder referred to as "edge molding retainer"), the retainer being secured to a roof panel as a separate element in relation to a rear window frame or a header inner panel.

The length of the retainer is substantially equivalent to about half a wavelength of broadcast waves in, e.g., the TV bands. High-frequency pickups are longitudinally disposed on both sides of the roof panel in close proximity to the peripheral edge of the retainer.

The length of the edge molding retainer is set at a length which facilitates the resonance of the surface currents flowing on the marginal edge portions of a vehicle body with respect to the frequency of 50 MHz or more. The retainers are disposed apart from the rear window frame at the rear portion of a vehicle body and the header inner panel at the front portion of the vehicle body, respectively, by a distance of about $2 \times 10^{-3} \times$ wavelength, thereby enhancing the degree of concentration of the currents flowing on the marginal edge portion of the vehicle body, and a loop antenna of each high-frequency pickup is longitudinally disposed in the vicinity of the peripheral edge of the corresponding retainer.

Such an automobile antenna system for diversity reception is advantageous in that not only is it capable of enhancing the degree of concentration of the currents flowing on the marginal edge portions of the vehicle body, but also each high-frequency pickup compensates for any degradation of sensitivity in correspondence with the direction in which broadcast waves are received, whereby the best possible diversity reception is enabled without any external exposure of the antenna system.

Figure 2:
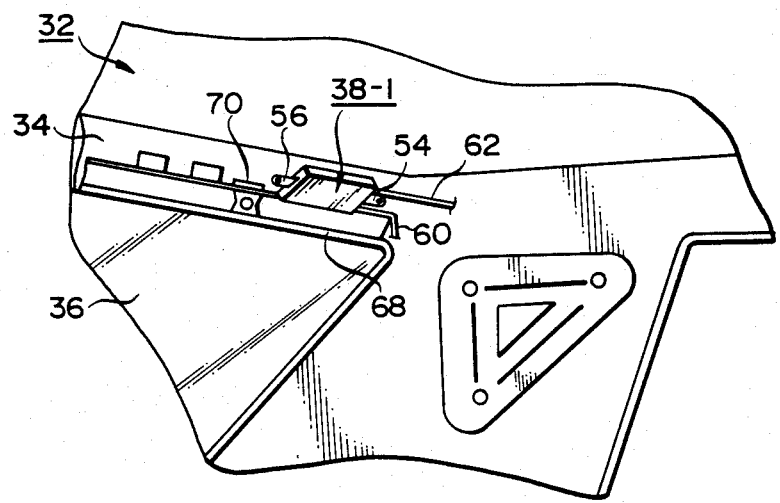
FIG. 2 shows a high-frequency pickup incorporated in the diversity antenna system shown in FIG. 1, in the state of being mounted on the roof panel at the rear portion of the vehicle body.
Figure 3:
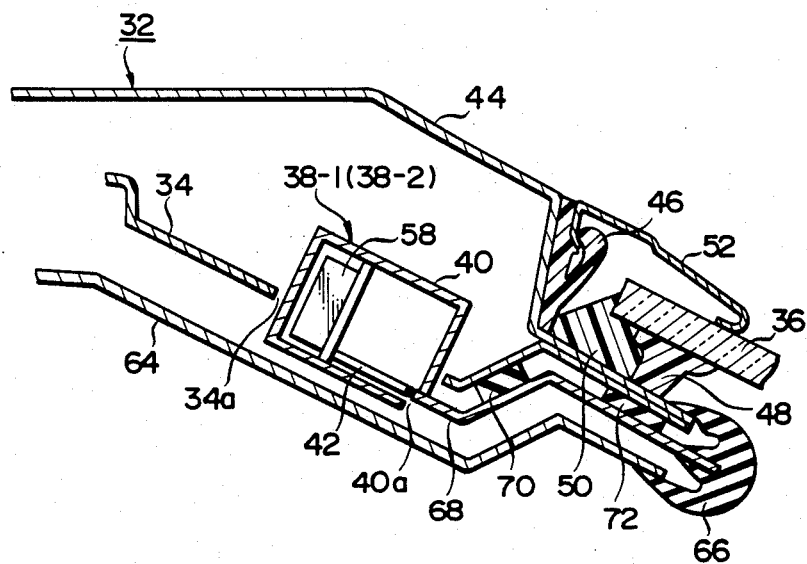
FIG. 3 is a cross sectional view of the pickup shown in FIG. 2.

FIGS. 2 and 3 show the high-frequency pickups which are disposed in proximity to the peripheral edge of the rear window glass.

In FIG. 2, a roof panel 32 is shown in the exposed state. The metal roof panel 32 is connected to a rear window glass 36 through a rear window frame 34. In this embodiment, the high-frequency pickups 38 - 1 and 38 -2 are disposed on both sides of the roof panel in the vicinity of the peripheral edge of an edge molding retainer 68, as described above.

FIG. 3 is a cross sectional view of the high-frequency pickup 38 in the state of being mounted on the roof panel 32 at the rear portion of the vehicle body. The high-frequency pickup 38 includes a metal casing 40 which shields a loop antenna 42 provided therewithin from external magnetic flux, thereby constituting an electrostatic magnetic coupling type pickup having a structure similar to the above-described probe which includes a loop coil.

In FIG. 3, the roof panel 32 includes a roof panel 44, and the rear window frame 34 is secured to one end of the roof panel 44. The rear window glass 36 is secured to the roof panel 44 through a fastener 46 and a dam 48, these two being air-tightly bonded by an adhesive 50.

A molding 52 is fixed between the roof panel 44 and the rear window glass 36.

A roof garnish 64 is secured to the roof panel 44 on the inside of the rear window frame 34, namely, on the inside of the vehicle body, and an edge molding 66 is secured extendingly to both of one side end portion of the roof garnish 64 and the rear window frame 34.

An edge molding retainer 68 is provided between the rear window frame 34 and the roof garnish 64 in order to mount the edge molding 66.

The retainer 68 is separated from the rear window frame 34 by spacers 70 and 72, thereby promoting the concentration of surface currents.

Figure 4:
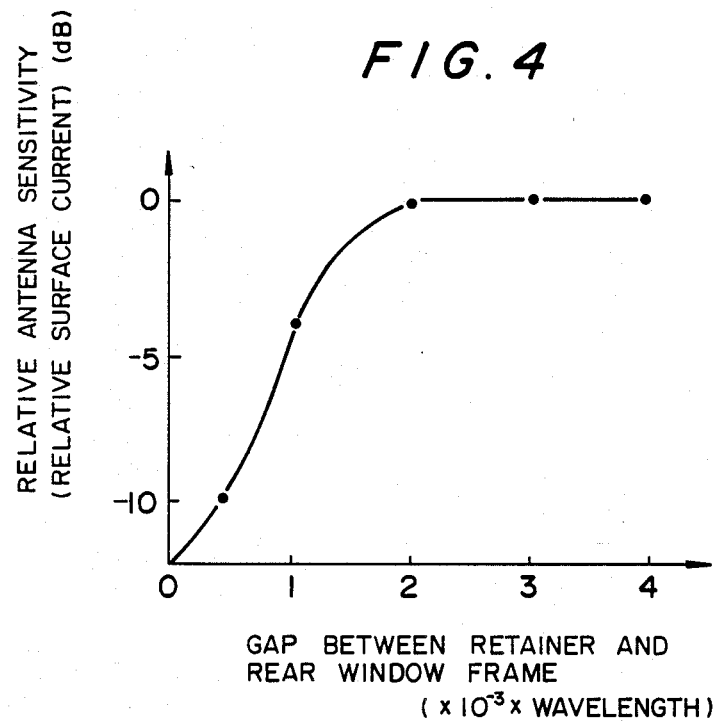
FIG. 4 shows the change in relative antenna sensitivity with respect to the space between the rear window frame and a retainer.

FIG. 4 shows a change in antenna sensitivity, namely, the changed value of the density of surface currents in relation to the space between the rear window frame 34 and the retainer 68. As is clear from the graph, the density of the surface currents reaches its maximum when the space is about $2 \times 10^{-3} \times$ wavelength. That is, the degree of concentration of currents which flow on the marginal edge portion is enhanced by separating the retainer 68 from the rear window frame 34 by the distance corresponding to that value.

In this embodiment, an opening 34a is provided on a part of the rear window frame 34 in order that the casing 40 of the high-frequency pickup 38 may be inserted into the opening 34a, whereby the loop antenna 42 of the high-frequency pickup 38 is opposed to the peripheral edge portion of the retainer 68.

Since the retainer 68 is a distance of about $2\times10^{-3}\times$ wavelength apart from the rear window frame 34, as described above, and this distance is approximately equal to about 2 to $4\times$ wavelengths with respect to the UHF band, the tendency of surface currents to concentrate there is further strengthened, thereby enabling high-sensitivity reception.

Figure 5:
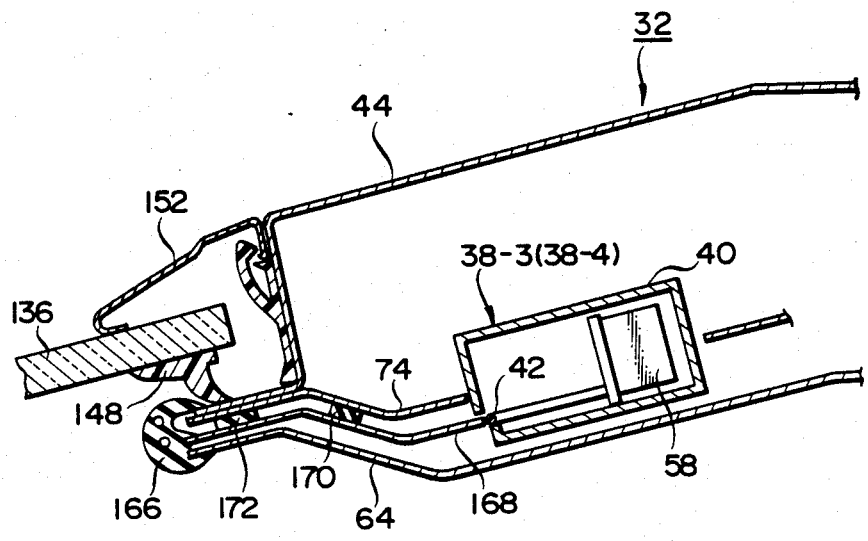
FIG. 5 shows a high-frequency pickup incorporated in the diversity antenna system in the state of being mounted on the roof panel at the front portion of the vehicle body.

FIG. 5 is a cross sectional view of the other high-frequency pickups 38 - 3 and 38 -4 which constitute a diversity antenna in the state of being mounted on the roof panel 32 at the front portion of the vehicle body. The high-frequency pickups 38 are provided in the vicinity of the peripheral edge of the roof panel 32 on the front side, and are disposed in a service hole 74a of a header inner panel 74 in the same manner as described above.

A front window glass 136 is secured to the roof panel 44 of the roof panel 32 through a dam 148, and a molding 152 connects the roof panel 44 and the front window glass 136.

An edge molding retainer 168 is provided between the header inner panel 74 and the roof garnish 64 in the same manner as described above in order to mount the edge molding 166. The edge molding retainer 168 is separated from the header inner panel 74 by spacers 170 and 172, thereby promoting the concentration of surface currents.

Thus, the magnetic flux induced by the high-frequency surface currents and flowing on the peripheral portions of the header inner panel 74 is positively caught by the loop antenna 42 within the casing 40, while being shielded from external electromagnetic waves by the casing 40, so that the high-frequency pickups 38 are capable of detecting the currents induced on the vehicle body with high sensitivity.

In this embodiment, a portion of the loop antenna 42 which is exposed from the casing 40 is disposed within a distance of 4.5 cm from the peripheral ends of the retainers 68 and 168, whereby it is possible to detect the surface currents induced by the broadcast waves of a frequency of more than 50 MHz, in particular, in the FM bands and the TV bands, and flowing on the vehicle body. Since the surface currents flow along the marginal portions of the vehicle body, as is clear from FIG. 4, the loop antennas 42 are disposed longitudinally along the peripheral edge portions of the retainers 68 and 168.

Figure 6:
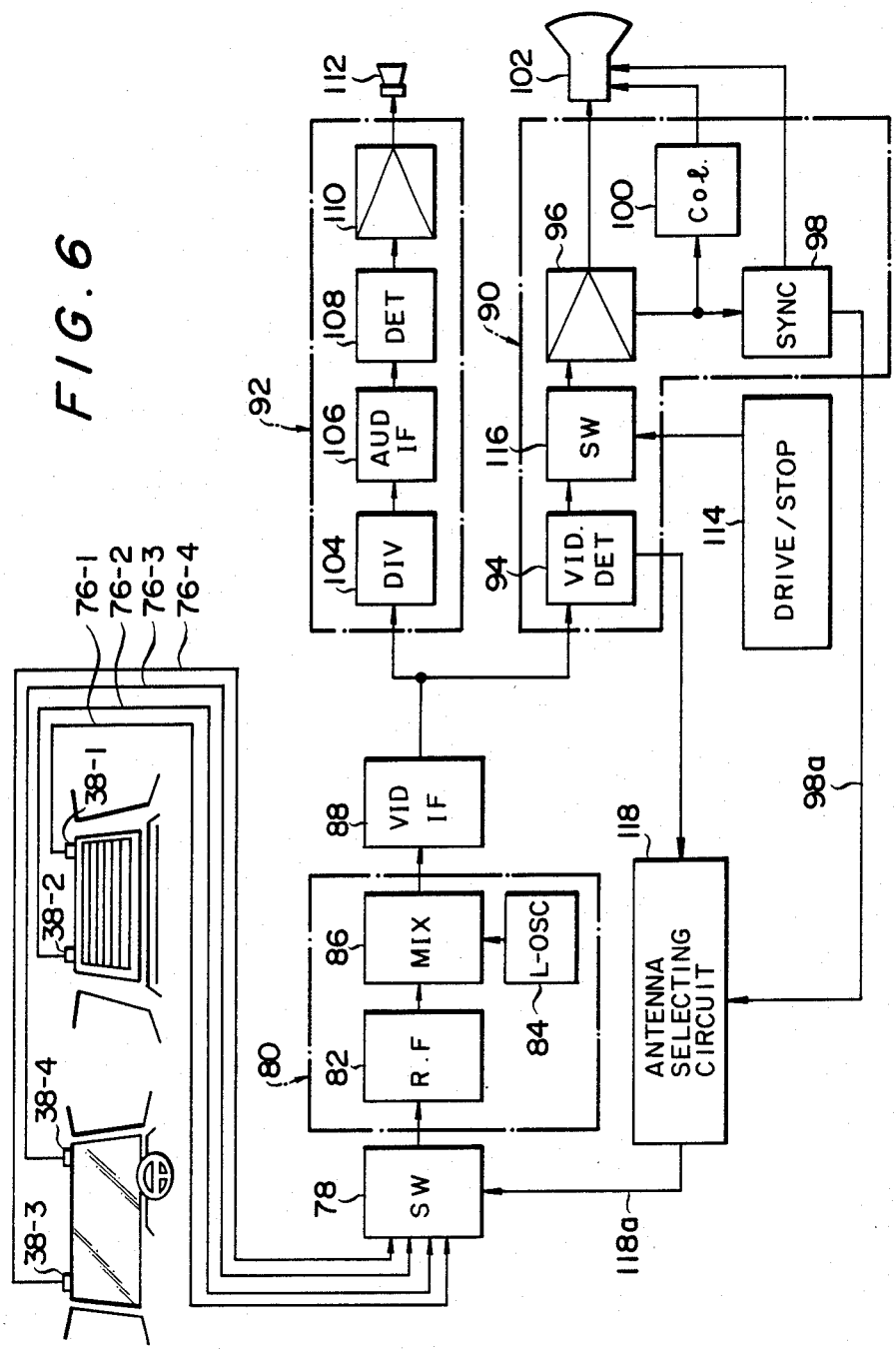
FIG. 6 is a block diagram for controlling the antenna system according to the present invention.

The structure of the circuit in which broadcast waves are received by the pickup enjoying the optimum reception which is automatically selected from among the pickups 38 - 1 to 38 - 4 will now be explained with reference to FIG. 6.

Four TV antennas each of which consists of a high-frequency pickup 38 - 1, 38 - 2, 38 - 3, or 38 - 4, are provided on the roof panel on the front and rear portions of the vehicle body, and the receiving signals of these four high-frequency pickups are input to a switching circuit 78 by coaxial cables 76 - 1 to 76 - 4.

The switching circuit 78 performs changeover among these high-frequency pickups 38 which are used for receiving TV broadcast waves by selecting a signal from those output by these four pickups 38 - 1 to 38 -4 and outputting it to a tuner 80.

The tuner 80 which selects a channel from the receiving signal is composed of a known circuit of a high-frequency amplifier 82, a local oscillator 84 and a mixer 86.

After the channel selection by the tuner 80, the receiving signal is amplified by a video intermediate frequency amplifier 88 and is output to a video display circuit 90 and a sound output circuit 92.

The video display circuit 90 has a known structure, namely, it is composed of a video detection circuit 94, a video amplifier 96, a synchronizing deflection circuit 98 which is connected to a deflection circuit of a cathode-ray tube 102 through a vertical deflection and horizontal deflection circuitry, and a chromaticity circuit 100 which is connected to the grid of the cathode ray tube 102.

A video signal is detected by the video detection circuit 94, amplified by the video amplifier 96, and thereafter displayed on the cathode-ray tube 102.

The sound output circuit 92 in this embodiment also has a known structure, namely, it is composed of a sound separation circuit 104, a sound intermediate frequency amplifier 106, a sound detection circuit 108 and a sound amplifier 110. The sound signal is separated from the signal output by the video intermediate frequency amplifier 88 and is detected to be output by a speaker 112.

In this manner, the automobile TV separates a receiving signal into the video signal and the sound signal, and displays the video signal on the cathode-ray tube 102 and outputs the sound signal from the speaker 112.

The antenna system in this embodiment includes a driving state judgement circuit 114 and a switch 116 which is provided between the video detection circuit 94 and the video amplifier 96 so as to turn on and off the video signal. When the driving state judgement circuit 114 detects that the vehicle is stationary, it turns the switch 116 on, while when it detects that the vehicle is running it turns the switch 116 off.

Figure 7:
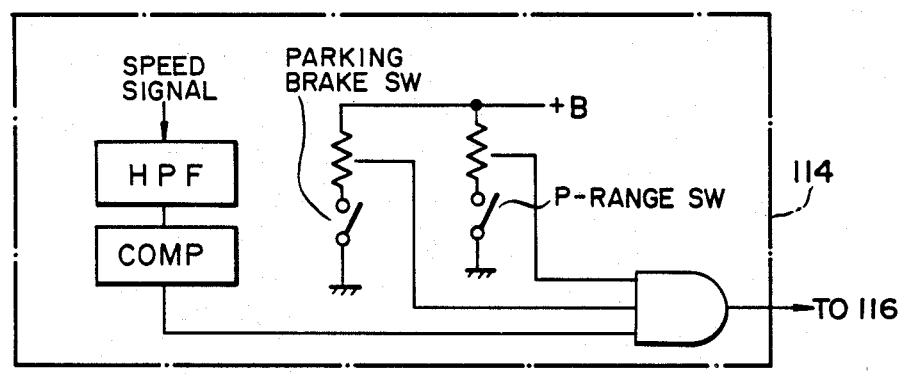
FIG. 7 is a detailed view of a driving state judgement circuit in FIG. 6.

FIG. 7 shows the circuit structure of the driving state judgement circuit 114. When both a parking position switch and a hand brake switch are on, and the vehicle speed is below a predetermined value, the circuit in this embodiment judges the vehicle is in the parking mode, and a high-level signal is output from the AND gate to turn the switch 116 on. In the other cases, the circuit judges that the vehicle is in the running mode, and a low level signal is output from the AND gate to turn the switch 116 off.

The vehicle speed is detected by inputting a vehicle speed detection pulse into a comparator through a high pass filter and comparing the pulse with a predetermined reference value.

Therefore, in the antenna system in this embodiment, when the vehicle is stationary, the switch 116 is on and therefore a picture is displayed on the cathode-ray tube 102, and sound is output from the speaker 112. On the other hand, when the vehicle is running, the switch 116 is off, and therefore no picture is displayed on the cathode-ray tube 102 and sound alone is output from the speaker 112.

In this way, the antenna system in this embodiment only outputs sound from the speaker, thereby preventing the attention of the driver from being distracted from driving to the picture displayed on the cathode-ray tube 102. In such an automobile TV set, since the receiving state of the antenna changes during the travel of the vehicle, a diversity reception system is adopted in order to obtain a good picture and sound. In this diversity reception system, the receiving operation is taken over, in correspondence with a change in the receiving state of waves, by the optimum pickup among the pickups 38 - 1 to 38 - 4 which enjoys the best reception by automatic changeover.

The switching circuit 78 for switching antennas, changes the present antenna to the antenna which enjoys the optimum reception by an antenna switching circuit 118 which produces a switching signal 118a when the output of the video detection circuit 94 is lowered below a predetermined level. It is also possible to switch the antenna on the basis of a sound detection output.

It is also possible to switch antennas during the flyback period of the scanning lines with the antenna switching timing synchronized with a vertical synchronizing signal 98a.

Figure 8:
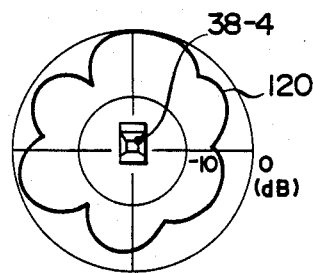
FIGS. 8(a) and 8(b) show the directional patterns of antennas in the TV bands.
Figure 8:
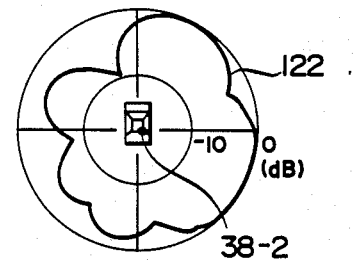

FIGS. 8(a) and 8(b) show the directional characteristic of the antenna in the TV band, exhibited when the high-frequency pickup is mounted on the right front position, and when it is mounted on the right rear portion, respectively.

As is clear from the characteristic curves 120 and 122, diversity reception by means of a plurality of high-frequency pickups is capable of compensating for any degradation of sensitivity in correspondence with the direction in which broadcast waves are received, thereby enabling the best possible reception of TV waves.

As described above, according to the present invention, high-frequency pickups for detecting the high-frequency surface currents which flow on the marginal portions of a vehicle body are disposed on both sides of the front and rear portions of the vehicle body in close proximity to the respective peripheral edges, and receiving operation is taken over by the pickup which enjoys superior reception by automatic changeover. As a result, the directional characteristics of the antenna is improved and multipath noise is reduced without any external exposure of the antenna system.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. An automobile antenna system for diversity reception comprising:
    first high-frequency pickup means mounted at a front marginal edge portion at a first side on the vehicle body for receiving broadcast waves by detecting high-frequency currents induced on the vehicle body by the broadcast waves;
    second high-frequency pickup means mounted at a front marginal edge portion at the second side on the vehicle body for receiving broadcast waves by detecting high-frequency currents induced on the vehicle body by the broadcast waves;
    third high-frequency pickup means mounted at a rear marginal edge portion at the first side on the vehicle body for receiving broadcast waves by detecting high-frequency currents induced on the vehicle body by the broadcast waves;
    fourth high-frequency pickup means mounted at a rear marginal edge portion at the second side on the vehicle body for receiving broadcast waves by detecting high-frequency currents induced on the vehicle body by the broadcast waves;
    pickup selection means operatively connected to said first to fourth high-frequency pickup means for switchably selecting an output from any one of said first to fourth high-frequency pickup means, said pickup selection means comparing the selected output to a predetermined threshold limit and switching to another output of said first to fourth high frequency pickup means when the selected output is lower than the predetermined threshold;
    each of said first to fourth high-frequency pickup means including a loop antenna and a shielding case, said shielding case having a slotted opening through which one longitudinal side of said loop antenna is exposed, said casing being disposed so that each of said loop antennas face the respective marginal edge portion of the vehicle body.

2. An automobile antenna system for diversity reception according to claim 1, wherein said first to fourth high-frequency pickup means are longitudinally disposed at different positions in the vicinity of the peripheral edge of a roof panel of said vehicle body spaced from each other by a predetermined distance for effectively pickup up the high-frequency surface currents which are induced on a vehicle body by broadcast waves and which flow concentratedly on the peripheral edge portions of said roof panel, and characterized in that edge molding retainers having a length which facilitates the resonance of said surface currents flowing on the marginal edge portion of said vehicle body with respect to the frequency of 50 MHz or more are disposed apart from a rear window frame at the rear portion of said vehicle body and a header inner panel at the front portion of said vehicle body, respectively, by a distance of about $2 \times 10^{-3} \times$ wavelength, thereby enhancing the degree of concentration of said currents flowing on the marginal edge portions of said vehicle body, and in that the loop antenna of each of said high-frequency pickup means is longitudinally disposed in proximity to the peripheral edge of said retainer.

3. An automobile antenna system for diversity reception according to claim 1, wherein said first to fourth high-frequency pickup means are disposed at the right and left peripheral edge portions of said rear window frame which faces a rear window glass and in the vicinity of right and left peripheral edge portions of said header inner panel which faces a front window glass.

* * * * *